(12) United States Patent
Niiyama

(10) Patent No.: US 11,947,793 B2
(45) Date of Patent: Apr. 2, 2024

(54) PORTABLE TERMINAL, DISPLAY METHOD, AND STORAGE MEDIUM

(71) Applicant: Seiko Epson Corporation, Tokyo (JP)

(72) Inventor: Shinichiro Niiyama, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 129 days.

(21) Appl. No.: 17/649,412

(22) Filed: Jan. 31, 2022

(65) Prior Publication Data

US 2022/0244843 A1    Aug. 4, 2022

(30) Foreign Application Priority Data

Feb. 2, 2021  (JP) ................................. 2021-014823

(51) Int. Cl.
*G06F 3/04883*     (2022.01)
*G06F 3/12*        (2006.01)

(52) U.S. Cl.
CPC ........ *G06F 3/04883* (2013.01); *G06F 3/1203* (2013.01); *G06F 3/1253* (2013.01); *G06F 3/1292* (2013.01)

(58) Field of Classification Search
CPC .................................................. G06F 3/04883
See application file for complete search history.

(56) References Cited

U.S. PATENT DOCUMENTS

| | | | | |
|---|---|---|---|---|
| 2007/0124702 | A1* | 5/2007 | Morisaki ............... | G06F 3/0304 715/863 |
| 2013/0215153 | A1* | 8/2013 | Park ..................... | G06F 1/1694 345/650 |
| 2015/0130709 | A1 | 5/2015 | Dangi et al. | |
| 2016/0261672 | A1* | 9/2016 | Kawakami .......... | G06F 3/04883 |

FOREIGN PATENT DOCUMENTS

| | | |
|---|---|---|
| CN | 104679434 | 6/2015 |
| JP | 2015-095232 | 5/2015 |
| JP | 2017-134632 | 8/2017 |

* cited by examiner

*Primary Examiner* — Samantha (Yuehan) Wang
(74) *Attorney, Agent, or Firm* — WORKMAN NYDEGGER

(57) ABSTRACT

Provided is a portable terminal including a communication section configured to acquire operational information about a monitoring target device, a display section, a detector configured to detect a gesture motion involving a change in orientation of the portable terminal, and a processor configured to, when the gesture motion is detected while a first screen including an object in accordance with content of the operational information is displayed on the display section, cause a screen in accordance with a type of the gesture motion and a type of the object included in the first screen to be displayed on the display section. When the operational information differs, the object included in the first screen differs and, even when the same gesture motion is detected, a different screen is displayed.

10 Claims, 5 Drawing Sheets

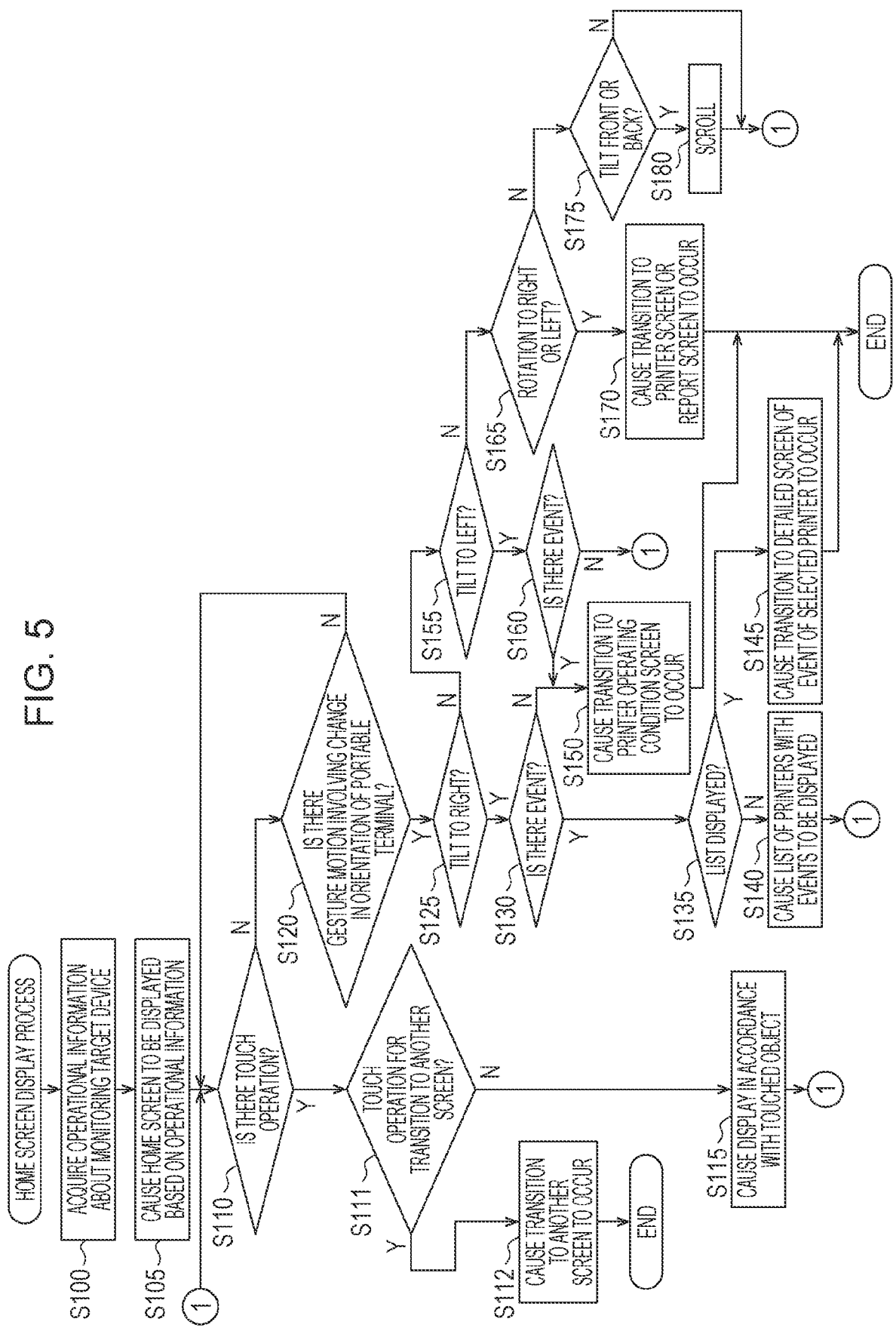

PORTABLE TERMINAL, DISPLAY METHOD, AND STORAGE MEDIUM

The present application is based on, and claims priority from JP Application Serial Number 2021-014823, filed Feb. 2, 2021, the disclosure of which is hereby incorporated by reference herein in its entirety.

BACKGROUND

1. Technical Field

The present disclosure relates to a portable terminal, a display method, and a storage medium.

2. Related Art

In operating a smartphone or the like, a known configuration is that an instruction of the user is received via a use gesture, such as shaking the smartphone, in addition to touch operations on the touch panel, so as to cause a screen transition to occur (for example, JP-A-2017-134632 and JP-A-2015-95232).

In factories and other facilities, users often wear gloves at work. A touch operation on the touch panel of a portable terminal performed by a user wearing gloves may not result in a screen transition occurring.

SUMMARY

A portable terminal includes a communication section configured to acquire operational information about a monitoring target device, a display section, a detector configured to detect a gesture motion involving a change in orientation of the portable terminal, and a processor configured to, when the gesture motion is detected while a first screen including an object in accordance with content of the operational information is displayed on the display section, cause a screen in accordance with a type of the gesture motion and a type of the object included in the first screen to be displayed on the display section. When the operational information differs, the object included in the first screen differs and, even when the same gesture motion is detected, a different screen is displayed.

A display method includes acquiring operational information about a monitoring target device, detecting a gesture motion involving a change in orientation of the portable terminal, and, when the gesture motion is detected while a first screen including an object in accordance with content of the operational information is displayed on the display section, causing a screen in accordance with a type of the gesture motion and a type of the object included in the first screen to be displayed on a display section. When the operational information differs, the object included in the first screen differs and, even when the same gesture motion is detected, a different screen is caused to be displayed.

A non-transitory computer-readable storage medium storing a display program that causes a portable terminal to execute a process. The process includes acquiring operational information about a monitoring target device, detecting a gesture motion involving a change in orientation of the portable terminal, and, when the gesture motion is detected while a first screen including an object in accordance with content of the operational information is displayed on the display section, causing a screen in accordance with a type of the gesture motion and a type of the object included in the first screen to be displayed on the display section. When the operational information differs, the object included in the first screen differs and, even when the same gesture motion is detected, a different screen is caused to be displayed.

BRIEF DESCRIPTION OF THE DRAWINGS

FIG. 5 is a flowchart of a home screen display process.

DESCRIPTION OF EXEMPLARY EMBODIMENTS

Figure 1:
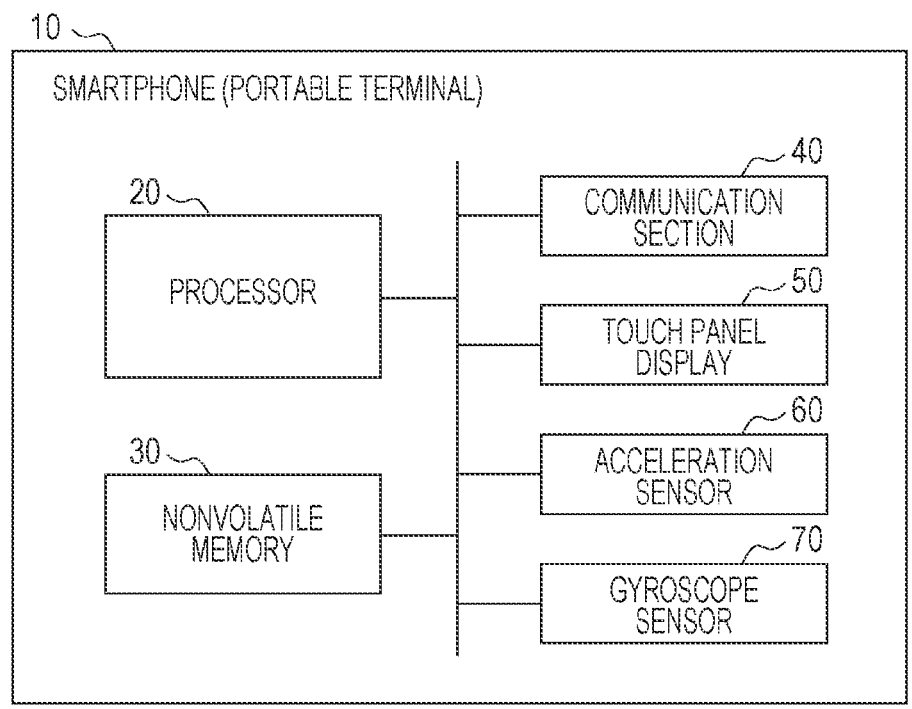
FIG. 1 is a block diagram of a portable terminal.

An embodiment of the present disclosure will be described here according to the following order.
(1) Configuration of Portable Terminal
(2) Main Screen Display Process
(3) Other Embodiments 1. Configuration of Portable Terminal FIG. 1 is a block diagram illustrating a configuration of a smartphone 10 according to an embodiment of the present disclosure. The smartphone 10 includes a processor 20, a nonvolatile memory 30, a communication section 40, a touch panel display 50, an acceleration sensor 60, and a gyroscope sensor 70. The processor 20 includes a central processing unit (CPU), a random-access memory (RAM), a read-only memory (ROM), and other components, which are not illustrated, and is capable of executing various programs recorded in the nonvolatile memory 30. The communication section 40 includes communication interface circuitry for communicating with other devices according to various communication standards such as LTE (registered trademark) and Wi-Fi (registered trademark). The processor 20 may communicate via the communication section 40 with a server (not illustrated) that collects operational information about a monitoring target device.

In the present embodiment, the smartphone 10 is used so that a worker (also called a user) views the operational information about a printer, which is a monitoring target device, for example, at a printing factory where a plurality of printers are installed. The server mentioned above (not illustrated) is configured to accumulate operational information collected from each printer and sends the operational information to the smartphone 10 in response to a request from the smartphone 10.

The operational information is information indicating operating conditions of a monitoring target device. In the present embodiment, examples of the operational information include the current day performance of a printer group (the number of print jobs, the total printing area, the operating ratio, and so on), information about printers with errors, and information about printers with warnings.

The touch panel display 50 includes a touch detection panel and a display panel (display section) superposed on the touch detection panel. The touch panel display 50 is, for example, a capacitive touch panel used in a smartphone. The processor 20 may cause various types of information to be displayed on the display panel of the touch panel display 50. Upon detection of a touch operation on the touch detection panel, the processor 20 causes information indicating a touch position and other factors to be delivered to the processor 20. The processor 20 identifies the operation of the user by using the position of an object being displayed on the display panel and the touch position and executes processing in accordance with the operation.

The smartphone 10 is configured to be operable even when the user is wearing gloves. The acceleration sensor 60, which is a three-axis acceleration sensor, measures and outputs an acceleration in each of the directions of three orthogonal axes defined in the smartphone 10. The processor 20 may detect the movement direction and other information items of the smartphone 10 based on the output of the acceleration sensor 60. The gyroscope sensor 70, which is a three-axis gyroscope sensor, measures and outputs an angular velocity relative to each of the three orthogonal axes defined in the smartphone 10. The processor 20 may detect the rotation of the smartphone 10 based on the output of the gyroscope sensor 70. Thus, the acceleration sensor 60 and the gyroscope sensor 70 function as a detector that detects a gesture motion involving a change in the orientation of the smartphone 10.

In the present embodiment, tilt to the right, tilt to the left, rotation to the left, rotation to the right, tilt to the front, and tilt to the back of the gesture motions involving a change in the orientation of a portable terminal are assumed as gesture motions to be detected. Each gesture motion is defined, for example, as follows. Regarding the screen of the touch panel display 50, an axis extending in the up and down direction and passing through the center in the left and right direction is defined as the Y-axis, an axis extending in the left and right direction and passing through the center in the up and down direction is defined as the X-axis, and an axis passing through the intersection of the X-axis and the Y-axis and being perpendicular to the XY-plane is defined as the Z-axis. The tilt to the right is a gesture of rotating the Y-axis clockwise in the XY-plane by an angle greater than or equal to a predefined angle as viewed from the user and then returning the smartphone 10 to the original orientation. The tilt to the left is a gesture of rotating the Y-axis anticlockwise in the XY-plane by an angle greater than or equal to the predefined angle and then returning the smartphone 10 to the original orientation. In the present embodiment, of "tilt to the right" and "tilt to the left", "tilt to the right" is considered as an easy motion for the user.

The rotation to the left is a gesture of rotating the left end of the display surface of the touch panel display 50 away from the user and the right end toward the user and then returning the smartphone 10 to the original orientation. The rotation to the right is a gesture of rotating the right end of the display surface of the touch panel display 50 away from the user and the left end toward the user and then returning the smartphone 10 to the original orientation.

The tilt to the front is a gesture of tilting the top end of the display surface of the touch panel display 50 toward the user and the bottom end away from the user and then returning the smartphone 10 to the original orientation. The tilt to the back is a gesture of tilting the top end of the display surface away from the user and the bottom end toward the user and then returning the smartphone 10 to the original orientation. The processor 20 may detect these gestures based on the outputs of the acceleration sensor 60 and the gyroscope sensor 70.

Figure 2:
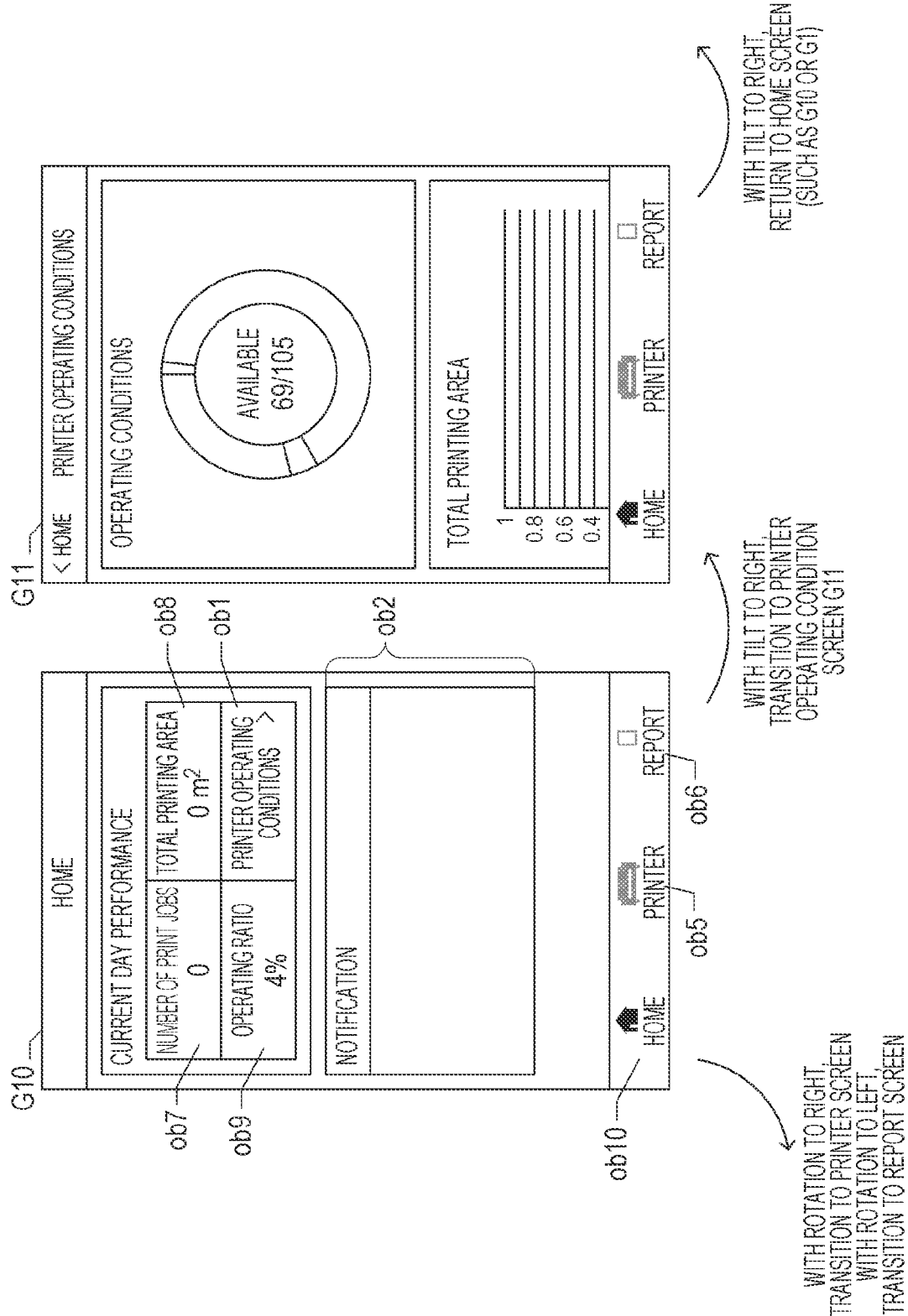
FIG. 2 is a pictorial representation of an example of screen transitions.

The processor 20 may execute an application program for providing operational information about a monitoring target device to the user. In response to a user operation to launch an application program for providing monitoring target printer information, the processor 20 first causes the touch panel display 50 to display a home screen. G10 in FIG. 2 is a graphical representation illustrating an example of a home screen. The home screen G10 includes an object ob7 indicating the number of print jobs, an object ob8 indicating the printing area, and an object ob9 indicating the operating ratio, and further includes an object ob1, a notification object ob2, an object ob5, an object ob6, and an object ob10. Of these objects, objects for transition from the home screen to another screen are the objects ob1, ob5, and ob6.

For example, the object ob1 is an object for transition to a printer operating condition screen G11. In response to detection of a touch operation on the object ob1, the processor 20 causes the touch panel display 50 to display the printer operating condition screen G11 in place of the home screen G10. The object ob5 is an object for transition to a printer screen (not illustrated) using a touch operation and the object ob6 is an object for transition to a report screen (not illustrated) using a touch operation.

The notification object ob2 displays an object indicating an event of every kind if the event has occurred in any printer. If no event has occurred in any printer, the notification object ob2 is blank as illustrated in the home screen G10 in FIG. 2.

Examples of the event include errors and warnings. An error corresponds to a first event indicating a shutdown of a monitoring target printer. A warning corresponds to a second event less urgent than an error. A printer with a warning has not been shut down. When events such as an error and a warning have occurred, as illustrated in a home screen G1 in FIG. 3, an object ob3 indicating the occurrence of the error and an object ob4 indicating the issuance of the warning are displayed in the notification object ob2. The numerical value displayed in the object ob3 represents the number of printers with errors. The numerical value displayed in the object ob4 represents the number of printers with warnings. The notification object ob2 corresponds to the object in accordance with content of the operational information, and the home screen (such as G10 or G1) including the notification object ob2 corresponds to the first screen in the present embodiment.

When a gesture motion involving a change in the orientation of the smartphone 10 is detected while the home screen (such as G1 or G10) including the notification object ob2 in such a manner is displayed on the touch panel display 50, the processor 20 functions as a processor that causes a screen in accordance with the type of the gesture motion and the type of an object included in the home screen to be displayed on the touch panel display 50.

As described above, when operational information differs, that is, when there is a difference in whether an error or warning has occurred or how many errors or warnings have occurred, the content displayed in the notification object ob2 differs. When such a home screen is displayed, the processor 20 is configured to display a screen that differs between when a specific condition is satisfied and when the specific condition is not satisfied, even if the same gesture motion is detected for both cases. The processor 20 determines that the specific condition is satisfied when the home screen includes an object indicating an event that has occurred in a printer. In the present embodiment, the specific condition is that an error or warning has occurred in a monitoring target printer group.

When the specific condition is not satisfied, the processor 20 causes a second screen to be displayed in response to detection of a first gesture motion. When the specific condition is satisfied, the processor 20 causes a third screen different from the second screen to be displayed in response to detection of the first gesture motion. In the present embodiment, the first gesture motion is tilt to the right, the second screen is the printer operating condition screen G11, the third screen, which is provided individually for a printer with an error or warning, is a detailed screen for notification of the details of the error or warning. The home screen G10 in FIG. 2 is a home screen that is displayed when the specific condition is not satisfied, that is, a home screen that is displayed when no error or warning has occurred. Upon detection of tilt to the right (the first gesture motion) while the home screen G10 is displayed, the processor 20 causes the printer operating condition screen G11 (the second screen) to be displayed in place of the home screen (the first screen). The printer operating condition screen G11, which is displayed when tilt to the right is detected while the home screen G10 is displayed, is the same screen as a screen resulting from the transition made when a touch operation on the object ob1 is detected.

On the home screen G10, the object ob1, the object ob5, and the object ob6 are objects for transition to another screen. In the present embodiment, the transition to the printer operating condition screen G11 associated with the object ob1 is assigned to the tilt to the right, which is a gesture that the user easily performs. While the home screen (such as G10 or G1) is displayed, upon detection of rotation to the right, the processor 20 causes a transition to a printer screen (not illustrated) to occur and, upon detection of rotation to the left, the processor 20 causes a transition to a report screen (not illustrated) to occur. In this way, processing of switching between the home screen, the printer screen, and the report screen in the order in accordance with the rotation directions is assigned to a rotation gesture to the right or left. The printer screen (not illustrated) resulting from the transition made when rotation to the right is detected is also a screen resulting from the transition made when a touch operation on the object ob5 is detected. The report screen (not illustrated) resulting from the transition made when rotation to the left is detected is also a screen resulting from the transition made when a touch operation on the object ob6 is detected.

Figure 3:
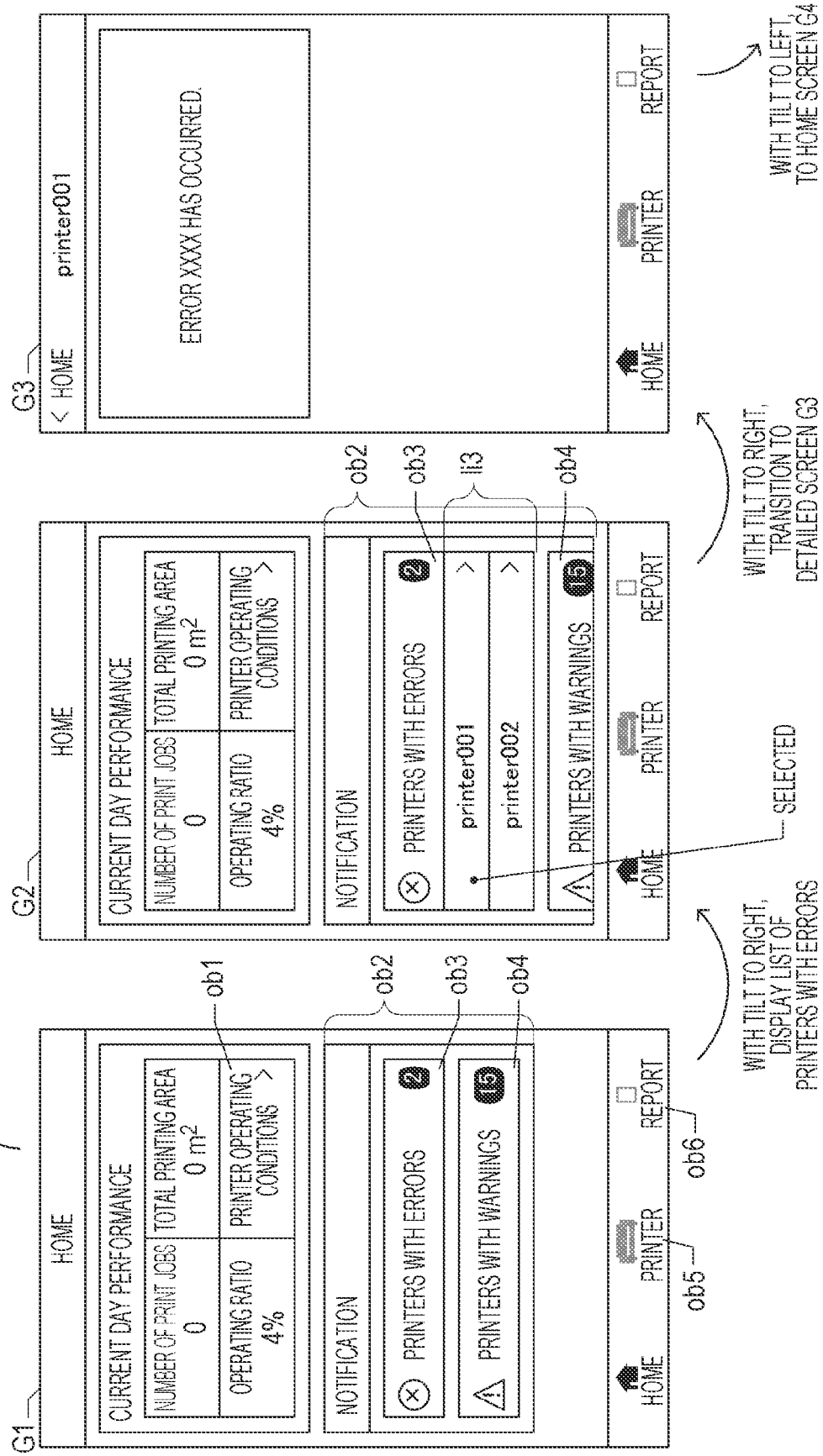
FIG. 3 is a pictorial representation of an example of screen transitions.

When a specific condition is satisfied, that is, when one tilt to the right (the first gesture motion) is detected while the objects ob3 and ob4 indicating an error and a warning are displayed as on the home screen G1 in FIG. 3, the processor 20 causes a list li3 of printers with errors, each of which is an event with a higher degree of urgency than a warning, to be displayed as on the home screen G2 in FIG. 3. Upon detection of one tilt to the right again while the list li3 is displayed as on the home screen G2, the processor 20 causes the detailed screen specific to one printer of the printers included in the list li3 to be displayed. In the case in FIG. 3, printer001, which is one of the two printers with errors, is selected, resulting in transition to a detailed screen G3 for the error of printer001.

Figure 4:
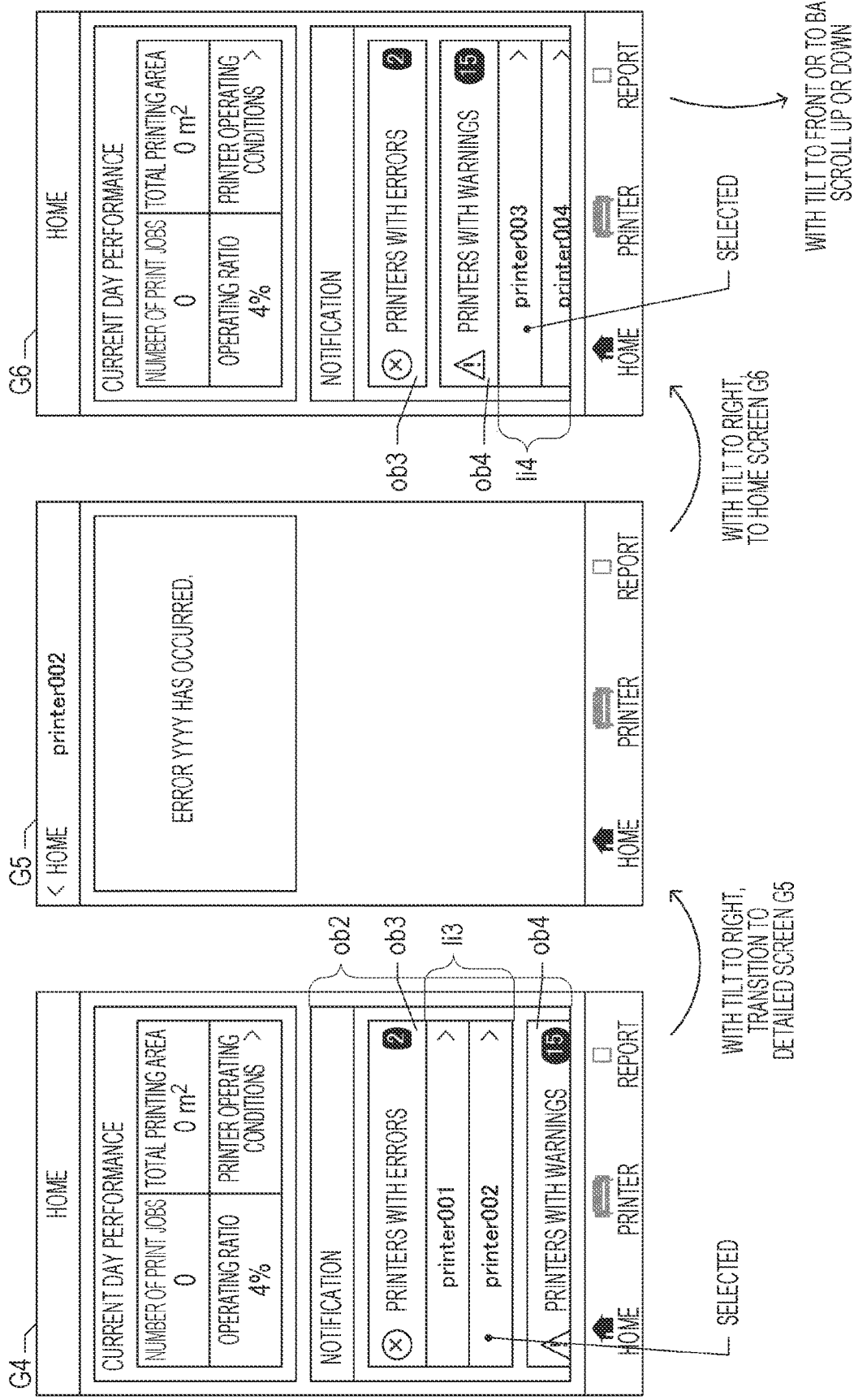
FIG. 4 is a pictorial representation of an example of screen transitions.

Upon detection of tilt to the right while the detailed screen G3 of printer001 in FIG. 3 is displayed, the processor 20 causes a transition to the home screen G4 illustrated in FIG. 4 to occur. With the home screen G4, the processor 20 causes printer002, which is a second printer of the two printers with errors, to be selected. Accordingly, upon detection of tilt to the right while the home screen G4 is displayed such that printer002 is selected, the processor 20 causes a transition to a detailed screen G5 for the error of printer002 to occur. As a result, the detailed screens of the two printers with errors are already displayed. Upon detection of tilt to the right while the detailed screen G5 is displayed, the processor 20 causes a transition to a home screen G6 to occur. With the home screen G6, the processor 20 now causes the list li3 of printers with errors to be hidden and causes a list li4 of printers with warnings, each of which is an event with a lower degree of urgency than an error, to be displayed. The processor 20 causes printer003 to be selected. Printer003 is a first printer of 15 printers with warnings. As described above, when there are a plurality of printers in each of which an error or warning has occurred, the detailed screens (third screens) are displayed in order from the highest degree of urgency (in display order for events with the same degree of urgency). A cursor or another indicator indicating which printer in a list is the target for which the detailed screen is to be displayed by the next tilt to the right is not displayed in the present embodiment (a printer being selected from the list li3 or the list li4 is internally managed in the processor 20).

When a specific condition is satisfied, that is, when an error or warning has occurred in a printer, the processor 20 causes a transition to the printer operating condition screen G11 (the second screen) to occur in response to detection of tilt to the left (a second gesture motion), which is a gesture different from tilt to the right (the first gesture motion).

As described above, even with the same gesture "tilt to the right", the screen displayed after a transition from the home screen differs between a situation where an error or warning has occurred and a situation where no error or warning has occurred. In the present embodiment, "tilt to the right" is a gesture that is easier for the user to make than "tilt to the left". A gesture motion including a gesture that is easy for the user to make on the home screen and being allowed for even when the user is wearing gloves is assigned so as to be the same motion as the motion performed when an object with a higher priority (which may differ depending on the content of operational information) on the home screen is touched. Therefore, even when wearing gloves, the user can view information with a high degree of urgency using an easy operation. Particularly when working in a factory while wearing a glove, if the user is permitted to launch a monitoring application of a smartphone in advance, to unlock the smartphone using face recognition or another method other than a touch operation, and to cause a screen transition to occur by a gesture as mentioned above, the user can view information with a high degree of urgency without removing the glove each time an error or warning occurs.

For example, when there is an item that does not fully appear on the screen, such as the list li4 in FIG. 4, upon detection of tilt to the front or tilt to the back, the processor 20 scrolls up or down the content displayed on the screen and thus changes the display range.

2. Home Screen Display Process

FIG. 5 is a flowchart illustrating an example of a home screen display process. The process in FIG. 5 starts when a request for displaying the home screen is submitted. Examples of submission of a request for displaying the home screen include launching an application program for providing monitoring target printer information, updating the display content while the home screen is displayed after the application program has been launched, and transition to the home screen from another screen.

Upon start of the home screen display process, the processor 20 acquires operational information about a monitoring target device (step S100). That is, the processor 20 provides a request for operational information to a server via the communication section 40 and acquires the operational information transmitted in response to the request from the server.

Subsequently, the processor 20 causes a home screen (the first screen) to be displayed based on the operational information (step S105). That is, the processor 20 causes image data of objects included in the home screen to be displayed at predetermined positions. The content of each object reflects the content of the operational information. For example, the numerical value representing the number of print jobs reflects the value of the number of print jobs included in the operational information, and the numerical value representing the operating ratio reflects the value of the operating ratio included in the operational information. When the acquired operational information includes information indicating the occurrence of an error or a warning, the processor 20 causes the object ob3 or the object ob4 to be displayed in the notification object ob2. Regarding the object ob3 and the object ob4, when causing the home screen to be displayed in response to a request for displaying the home screen, the processor 20 initially causes the home screen to be displayed while the lists are closed as illustrated in FIG. 3. When the operational information includes neither error information nor warning information, the processor 20 causes the notification object ob2 to be displayed as blank.

Subsequently, the processor 20 determines whether there is a touch operation (step S110). That is, the processor 20 determines whether a touch operation on the touch panel display 50 is detected.

If it is determined in step S110 that there is a touch operation, the processor 20 determines whether the touch operation is performed on an object for a transition to another screen (step S111) and causes a transition to another screen to occur if the touch operation is performed on the object for transition to another screen (step S112). For example, when a touch operation is performed on the object ob1 of the home screen G10 (refer to FIG. 2), the processor 20 causes a transition to the printer operating condition screen G11 to occur. If it is not determined in step S111 that the touch operation is performed on an object for transition to another screen, the processor 20 causes display in accordance with the touched object (step S115). For example, the list of the object ob3 is hidden on the home screen G1 in FIG. 3. Under this condition, when a touch operation is performed on the object ob3, the processor causes the list li3 to be displayed as illustrated on the home screen G2 in FIG. 3.

If it is not determined in step S110 that there is a touch operation, the processor 20 determines whether there is a gesture motion involving a change in the orientation of a portable terminal (step S120). If it is not determined in step S120 that there is a gesture motion, the processor 20 returns to step S110.

If it is determined in step S120 that there is a gesture motion involving a change in the orientation of a portable terminal, the processor 20 executes a process in accordance with the type of the gesture motion. If the detected gesture motion is tilt to the right (step S125: Y), the processor 20 determines whether there is an event (step S130). That is, it is determined whether to satisfy a specific condition. Specifically, by referencing operational information, the processor 20 determines whether an event has occurred.

When it is not determined in step S130 that there is an event, that is, when the specific condition is not satisfied, the processor 20 causes a transition to the printer operating condition screen G11 to occur (step S150) and terminates the home screen display process. As a result, the printer operating condition screen G11 is displayed in place of the home screen G10 on the touch panel display 50. When it is determined in step S130 that there is an event, that is, when the specific condition is satisfied, the processor 20 determines whether the list has been displayed (step S135). Examples of the list include a list of printers with errors and a list of printers with warnings. If it is not determined in step S135 that the list has been displayed, the processor 20 causes a list of printers with events to be displayed (step S140) and returns to step S110.

If it is determined in step S135 that the event has been displayed, the processor 20 causes a transition to the detailed screen of an event of the printer selected internally to occur (step S145) and terminates the home screen display process. When a plurality of objects with different degrees of urgency, each of the plurality of objects indicating an event, are included, the processor 20 causes a detailed screen (the third screen) indicating detailed information on an event with a higher degree of urgency to be displayed in response to detection of "tilt to the right". The printer internally selected in the list changes each time the "tilt to the right" gesture is performed.

When the detected gesture motion is tilt to the left (step S155: Y), the processor 20 determines whether there is an event, that is, whether a specific condition is satisfied (step S160). Specifically, by referencing operational information, the processor 20 determines whether an event has occurred. When it is determined in step S160 that there is an event, that is, when the specific condition is satisfied, the processor 20 causes a transition to the printer operating condition screen to occur (step S150) and terminates the home screen display process. As a result, the printer operating condition screen G11 is displayed in place of the home screen G10 on the touch panel display 50. If it is not determined in step S160 that there is an event, the processor 20 returns to step S100. That is, even when tilt to the left is performed under the condition that there is no event, the display does not change.

If the detected gesture motion is rotation to the right or to the left (step S165: Y), the processor 20 causes a transition to the printer screen or the report screen to occur (step S170) and terminates the home screen display process. That is, when the gesture motion is rotation to the left, the processor 20 causes the report screen to be displayed in place of the home screen; when the gesture motion is rotation to the right, the processor causes the printer screen to be displayed in place of the home screen. If the detected gesture motion is tilt to the front or to the back (step S175: Y), the processor 20 scrolls the display range (step S180). If the detected gesture motion is not any one of tilt to the right, tilt to the left, rotation to the right or to the left, and tilt to the front or to the back, the processor 20 returns to step S110.

3. Other Embodiments

The embodiment described above is an example for carrying out the present disclosure, and other various embodiments may be employed. For example, the portable terminal may be any one of various electronic devices, such as a tablet computer, a laptop computer, a smartwatch, and smart glasses, other than a smartphone. The monitoring target device is not limited to a printer. The monitoring target device may be another electronic device, such as a robot. A portable terminal may be configured to acquire operational information via a server that collects operational information about a monitoring target device or may be configured to acquire the operational information by directly asking the monitoring target device for the operational information.

As the gesture motion involving a change in orientation of a portable terminal, various motions may be employed other than the motions employed in the embodiment described above. For example, a shaking motion, which causes a portable terminal to repeatedly vibrate in a specific direction, may be employed. For gesture motions that are likely to be performed by the user and for the order in which the user is likely to perform the gesture motions, the aspect of the embodiment described above is exemplary and other various aspects may be employed. The gesture motions and the order in which the user performs the gesture motions may be set for each user.

In a configuration in which when operational information differs, an object included in the first screen differs and, even when the same gesture motion is detected, a screen displayed as a result of making a transition from the first screen differs, an association of a gesture motion with a screen displayed as a result of making a transition using the gesture motion may be presented to the user. For example, a character, a symbol, an icon, or the like indicating a gesture motion associated with an object displayed on a screen may be displayed within the object. Specifically, for example, on the home screen G10 in FIG. 2, when the home screen G10 is configured to allow a transition to the printer operating condition screen G11 to be made in response to tilt to the right, an icon or the like indicating the tilt to the right may be displayed within the object ob1. In addition, when the home screen G2 in FIG. 3 is configured to allow a transition to the printer operating condition screen G11 to be made in response to tilt to the left, an icon or the like indicating the tilt to the left may be displayed within the object ob1. In addition, in the lists li3 on the home screen G2 in FIG. 3 and on the home screen G4 in FIG. 4 and in the list li4 on the home screen G6, the selected items and the non-selected items may be distinguishably displayed.

The specific condition may be a condition for switching whether to associate different processing operations with the same gesture motion. The specific condition may be the occurrence of a predetermined event in a monitoring target device or the occurrence of a predetermined event in a portable terminal. Additionally, the specific condition may be the occurrence of another event of which the user is to be notified. Regarding an event in a portable terminal, for example, a configuration may be employed in which even if the same gesture motion is carried out, information (a screen that is displayed after a transition) of which the user is to be preferentially notified differs between the case where the remaining battery amount of the portable terminal is less than or equal to a reference amount and the case where the remaining amount is not less than or equal to the reference amount.

A configuration may be employed in which it is determined that the specific condition is satisfied when an object indicating an event occurring in the monitoring target device is included in the first screen, and a configuration may be employed in which it is determined that the specific condition is satisfied when an event occurring in the monitoring target device is a specific event.

In addition to being divided into a first event indicating a shutdown of the monitoring target device and the second event less urgent than the first event, the events may be divided into more details and may be associated with priorities in terms of urgency.

Furthermore, as in the present disclosure, the embodiments are applicable as a computer-executable program and a method. In addition, a system, a program, and a method as described above are implemented as a single device in some cases and are implemented using parts included in a plurality of devices in other cases, such that they are implemented in various arrangements. In addition, the present disclosure may be changed as appropriate, such as being implemented partially as software and partially as hardware. Furthermore, the present disclosure is formed as a recording medium recording a program for controlling a system. Of course, the recording medium recording the program may be a magnetic recording medium or a semiconductor memory, and exactly the same consideration may be applied to any recording medium that would be developed in the future.

What is claimed is:

1. A portable terminal for monitoring a target device comprising:
    a communication section configured to acquire operating condition about the target device;
    a display section;
    a detector configured to detect a motion changing an orientation of the portable terminal; and
    a processor configured to, when the motion is detected while a first screen including an object in accordance with content of the operating condition is displayed on the display section, cause a screen in accordance with a type of the motion and a type of the object included in the first screen to be displayed on the display section, wherein
    when the operating condition differs, the object included in the first screen differs and, even when the same motion is detected, a different screen is displayed.

2. The portable terminal according to claim 1, wherein the detector is configured to detect a touch operation on the display section, and
    a screen displayed in response to detection of the motion is identical to a screen caused to be displayed by the processor when a touch operation on a given object in the first screen is detected.

3. The portable terminal according to claim 1, wherein the processor is configured to:
    cause a second screen to be displayed in response to detection of a first motion when a specific condition is not satisfied, and
    cause a third screen different from the second screen to be displayed in response to detection of the first motion when the specific condition is satisfied.

4. The portable terminal according to claim 3, wherein the processor is configured to determine that the specific condition is satisfied when an object indicating an event occurring in the target device is included in the first screen.

5. The portable terminal according to claim 4, wherein the processor is configured to, when a plurality of objects respectively indicating events are included in the first screen, cause the third screen indicating detailed information on an event with a higher degree of urgency to be displayed in response to detection of the first motion.

6. The portable terminal according to claim 5, wherein the events include a first event indicating a shutdown of the targeting device and a second event less urgent than the first event.

7. The portable terminal according to claim 3, wherein the processor is configured to cause the second screen to be displayed in response to detection of a second motion different from the first motion even when the specific condition is satisfied.

8. The portable terminal according to claim 1, wherein the operating condition includes at least one of information about the current day performance of the target device, information about the target device with errors, and information about the target device with warnings.

9. A display method comprising:
    acquiring operating condition about a target device;
    detecting a motion involving a change in orientation of the portable terminal; and
    when the motion is detected while a first screen including an object in accordance with content of the operating condition is displayed on the display section, causing a screen in accordance with a type of the motion and a type of the object included in the first screen to be displayed on a display section, wherein when the operating condition differs, the object included in the first screen differs and, even when the same motion is detected, a different screen is caused to be displayed.

10. A non-transitory computer-readable storage medium storing a display program that causes a portable terminal to execute a process, the process comprising:

acquiring operating condition about a target device;

detecting a motion involving a change in orientation of the portable terminal; and when the motion is detected while a first screen including an object in accordance with content of the operating condition is displayed on the display section, causing a screen in accordance with a type of the motion and a type of the object included in the first screen to be displayed on the display section, wherein when the operating condition differs, the object included in the first screen differs and, even when the same motion is detected, a different screen is caused to be displayed.

\* \* \* \* \*